Figure 1:
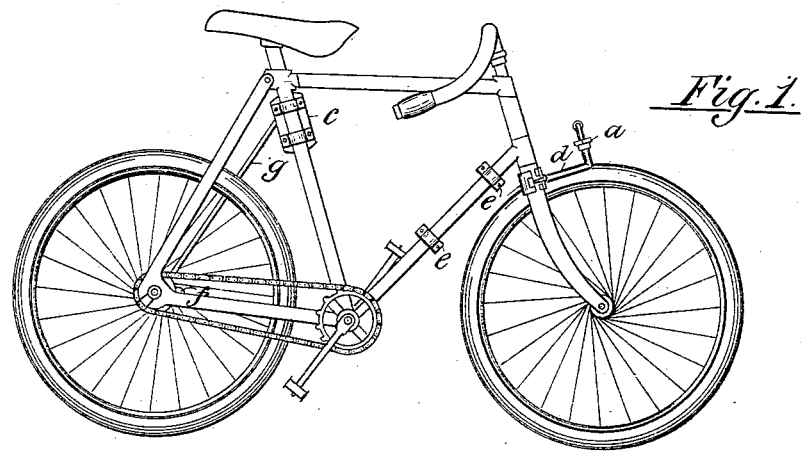

No. 616,407. Patented Dec. 20, 1898.
H. COTTRELL & H. C. CONDIT.
BICYCLE COUPLING.
(No Model.) (Application filed June 24, 1897.)

3 Sheets—Sheet 1.

Witnesses

Inventors
Herbert Cottrell
Howard C. Condit

No. 616,407. Patented Dec. 20, 1898.
H. COTTRELL & H. C. CONDIT.
BICYCLE COUPLING.
(Application filed June 24, 1897.)
(No Model.) 3 Sheets—Sheet 2.
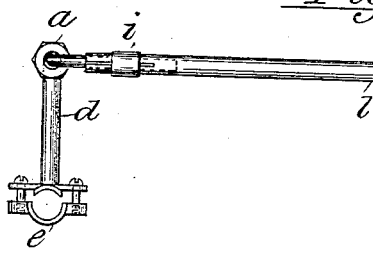
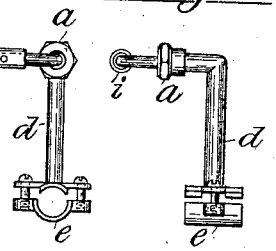
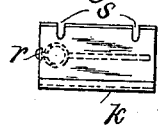
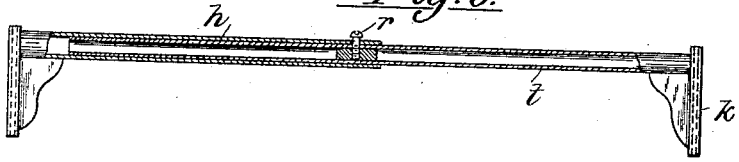
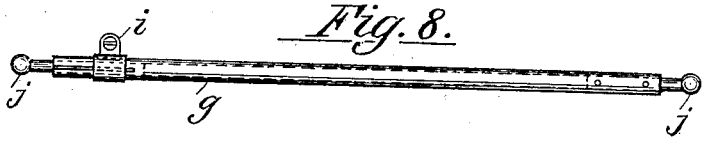
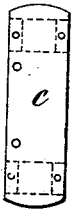
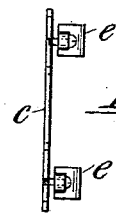
Witnesses  Inventors
Herbert Cottrell
Howard C. Condit
By Attorney
THE NORRIS PETERS CO., PHOTO-LITHO., WASHINGTON, D. C.

No. 616,407. Patented Dec. 20, 1898.
H. COTTRELL & H. C. CONDIT.
BICYCLE COUPLING.
(Application filed June 24, 1897.)
(No Model.)
3 Sheets—Sheet 3.
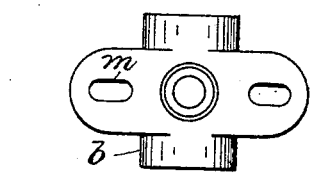
Fig. 13.
Fig. 20.
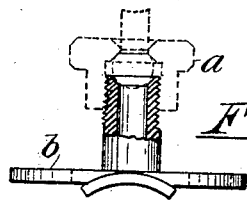
Fig. 14.
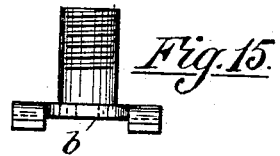
Fig. 15.
Fig. 21.
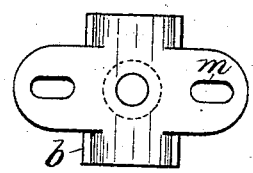
Fig. 16.
Fig. 17.
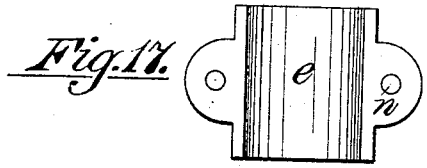
Fig. 18.
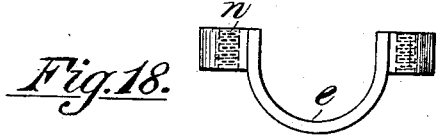
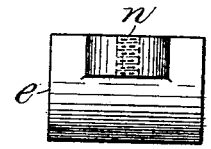
Fig. 19.
Fig. 22.
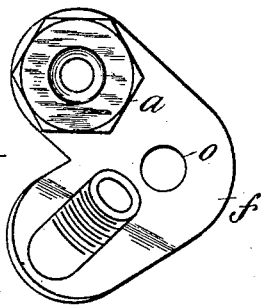
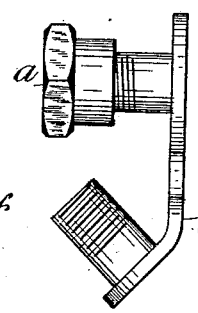
Fig. 23.
Witnesses
Frank H. Sommer
Wm. D. Libby
By Attorney
Inventors
Herbert Cottrell
Howard C. Condit
THE NORRIS PETERS CO., PHOTO-LITHO., WASHINGTON, D. C.

UNITED STATES PATENT OFFICE.

HERBERT COTTRELL, OF NEWARK, AND HOWARD C. CONDIT, OF MADISON, NEW JERSEY; SAID COTTRELL ASSIGNOR TO SAID CONDIT.

BICYCLE-COUPLING.

SPECIFICATION forming part of Letters Patent No. 616,407, dated December 20, 1898.

Application filed June 24, 1897. Serial No. 642,054. (No model.)

*To all whom it may concern:*

Be it known that we, HERBERT COTTRELL, of Newark, and HOWARD C. CONDIT, of Madison, New Jersey, have invented an Improvement in Bicycle-Couplings, of which the following is a full description.

The object of this invention is to provide a mechanism whereby two bicycles may be connected together side by side for use at a convenient distance apart and held firmly in a vertical position, while it also provides for an independent oscillatory motion to each, so that their wheels may conform to and ride over irregular surfaces without strain upon the bicycle-frames. Also it provides a means of adjusting the connecting mechanism so as to attain a perfect alinement of the two bicycles, and, further, it provides a means of disconnecting them readily and of quickly connecting them again without disturbing the position of the clips which secure the mechanism to the bicycle-frames and thus preserve their relative alinement, even though they may be connected and disconnected many times. In order that this connecting mechanism may be light and also strong, it is preferably constructed, as far as possible, of thin sheet steel and tubing; and it consists of the following parts: A transverse coupling-bar comprising two telescopic tubes adapted to turn axially and each provided upon one end with a socket-plate formed to connect with attaching-plates, and clips upon each bicycle-frame, preferably just below the saddle, to securely hold the bicycles in a vertical position and parallel to each other, while at the same time the bicycles are free to separately surmount obstacles and ride over uneven surfaces through the axial turning movement provided for in the telescopic tubes.

To reinforce and strengthen the operation of this coupling, we employ transverse couplings, adjustable as to length, to connect the bicycles at the rear axles and also between the forward portions of the frames.

We also strengthen our coupling by diagonal braces connecting it with plates upon the rear axles, and we provide a coupling, as is usual, to connect, preferably, at the forks for steering.

Figure 2:
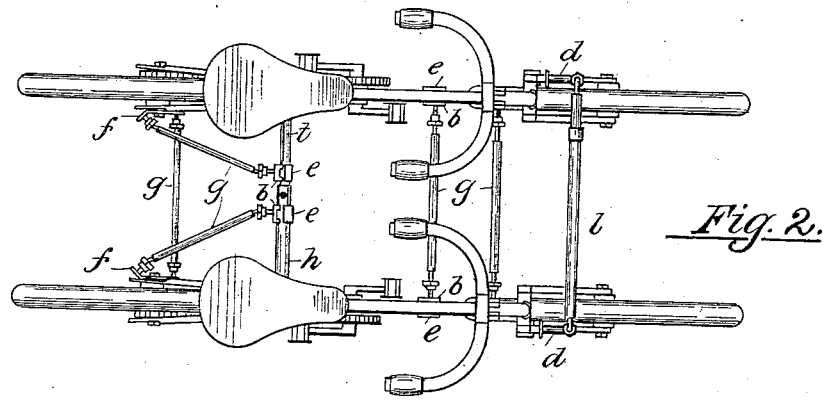

In the accompanying drawings, Figure 1 is a side elevation of a bicycle having our improved coupling attached thereto. Fig. 2 is a plan view of two bicycles connected together by our improved coupling. Figs. 3 to 23, inclusive, show the construction and details of this invention, in which similar letters of reference refer to similar parts.

Figs. 3 and 4 show the detailed construction of the steering-gear attachment to connect, preferably, upon the fork-prongs, in which the clips $e$, like all the other clips marked $e$, are formed of thin spring-steel, having strong lugs at each end drilled and tapped with screw-threads. They are so thin and elastic as to readily conform to the shape of that part of the bicycle to which they may be applied. The brackets $d$ are adapted to form part of the clip with $e$ and extend to a rectangular turn provided with a cap-nut $a$, which is fully shown in Figs. 14, 20, and 21, forming part of a ball-and-socket joint connecting the tube $l$, which is split at one end and has a short rod bent at right angles, with a ball of larger diameter than the rod formed on the end thereof, which, after placing the cap-nut $a$ upon the stem of the ball, is fitted into the end of tube $l$ and securely riveted in place, while upon the split end of tube $l$ similar parts are attached adjustably as to length by passing the stem of the ball into the tube and closing the split portion upon it by means of the spring-collar $i$, which is also shown in Fig. 9. The rectangular bend in bracket $d$ and in the ball-stem places the ball-and-socket joint in such position that the bracket may be turned upon the ball through the arc of a circle, while it also admits of a separate oscillating motion to each bicycle, thus enabling it to be guided over smooth or uneven surfaces with equal facility.

Figs. 8 and 9 show the construction of connections as used at rear axle and upon forward part of frame and are identical in structure with tube $l$, just described, except that the ball-stems are made straight instead of being bent at right angles. These tubes serve to hold the bicycles a certain distance apart and through the balls and sockets give freedom of motion.

Figs. 5, 6, 7, 10, 11, and 12 are details of the coupling-bar which connects the two bicycles together at a point just below the saddles, in which the tube *h* is shown as telescoping over about half the length of tube *t*, where it is secured from end motion by screw *r*, but is allowed to turn within the limits of slot *p* in tube *h* to give oscillatory motion. Within tube *t*, about equally distant from each end, is placed a plug to receive the screw *r* and give it a solid hold. On the end of tubes *h* and *t* is fastened a plate, as shown at *k*, Fig. 7, having a lap on one edge and a rectangular bend on the other edge, which is also slotted, as at *s*. The plates *k* are braced to hold them square upon the tubes *h* and *t*, as shown at *k*, Fig. 6.

In Figs. 10, 11, and 12 is shown the part used to attach the last-described coupling-bar to the bicycles, and consists of an oblong plate *c*, having clips *e e*, secured by screws to each end, adapting it to be secured upon the bicycle-frame, as shown at *c*, Fig. 1. The plates *c* are made of proper width and thickness in relation to plates *k*, so that they may fit within the recess formed by the lap and the rectangular bend thereof and be secured thereto by screws passing through slots *s* in plates *k* to threaded screw-holes in plates *c*. It is obvious that this construction admits of attaching and detaching the coupling-bar to the two bicycles without removing the plates *c* or the clips *e* therefrom, thus retaining their relative adjustment from time to time, and permits a quick-change for separate use or for use connected together.

Figs. 13, 14, 15, and 16 show the clamping-plate used in connection with the clip *e* to attach as at several places marked *e* in Figs. 1 and 2. It consists of a plate *b*, formed in part to conform to the shape of the tubing of the bicycle-frame, extending equally on each side and having oblong perforations *m*, through which pass the clamping-screws to the clips *e*. On the face of this clamping-plate projects a nipple, screw-threaded and countersunk at its outer end to accommodate the cap and ball-and-socket joint shown at *a* in dotted lines, Fig. 14. An inspection of this latter construction will disclose that the cap *a* when screwed off the nipple of clamping-plate *b* will remain on the ball-stem and be held thereon by reason of the diameter of the ball being larger than the opening in the cap through which the stem of the ball passes, thus securing it against being lost. It will also be seen that the connection may be quickly removed from the nipple on plate *b*, which, with the clip *e*, will then remain attached to the frame until it is desired to again connect the bicycles, thus preserving the relative alinement of the same.

Figs. 17, 18, and 19 show the spring-clip *e*, which is preferably formed of an oblong strip of thin spring-steel bent to conform to the part to which it is to be applied, having lugs on each end drilled and tapped with screw-threads, as shown at *n*, Figs. 18 and 19, and is used to hold the various parts of this coupling upon the bicycles, as stated and as shown in Figs. 1 and 2.

Figs. 20 and 21 show the construction of the cap *a*, the purpose of which is shown and described in connection with Fig. 14.

Figs. 22 and 23 show details of plates *f*, made right and left, bent, as shown, to accommodate diagonal connection, and having two nipples projecting therefrom, of like form and for like purpose as that described in connection with Fig. 14. They are applied at the rear axles of each bicycle by passing the end of the axle through hole *o* and securing on axle with nut. Reference to Fig. 2 will show that this plate *f*, with tube *g*, is used to connect the bicycles from axle to axle of the rear wheels and in a like manner by diagonal tubes *g* to the separate tubes *h* and *t* of the bracket-arm, the whole forming a system of connections, braces, clips, and joints, which when used together are adapted to maintain two bicycles in suitable relation to each for use, giving stability as to vertical position and flexibility of motion to traverse uneven roads, while it also causes the bicycles to steer in unison.

Without limiting ourselves as to the precise details of construction shown, what we claim, and desire to secure by Letters Patent of the United States, is—

1. In a mechanism to connect two bicycles side by side for use; the transverse coupling-bar comprising telescopic tubes *h*, *t*, adapted to turn axially; and each provided with socket-plate *k*, formed to connect with attaching-plates *c*, and clips *e*, upon each bicycle-frame; to securely hold the bicycles in a vertical position and parallel with each other, and also to give them freedom of movement to ride over uneven surfaces, through the axial motion provided for in the telescopic tubes *h*, *t*, substantially as shown and described.

2. In a bicycle-coupling, the combination with the transverse coupling-bar comprising the telescopic tubes *h*, *t*, each provided with socket-plate *k*, and adapted to turn axially on each other; and the connecting-plates *c*, and clips *e*, to attach them to the bicycle-frames; of the horizontal couplings *g*, and the diagonal braces *g*, connecting by universal joints respectively to tubes *h*, *t*, and plates *f*, on rear axles, substantially as shown and described.

In testimony that we claim the foregoing we have hereunto set our hands this 23d day of June, 1897.

HERBERT COTTRELL.
    HOWARD C. CONDIT.

Witnesses:
 FRANK H. SOMMER,
 WM. D. GIBBY.